United States Patent [19]

Struger et al.

[11] 4,095,094
[45] June 13, 1978

[54] MALFUNCTION DETECTION SYSTEM FOR A PROGRAMMABLE CONTROLLER

[75] Inventors: Odo J. Struger, Chagrin Falls; William W. Searcy, Richmond Heights; Ernest F. John, Willoughby, all of Ohio

[73] Assignee: Allen-Bradley Company, Milwaukee, Wis.

[21] Appl. No.: 779,916

[22] Filed: Mar. 21, 1977

Related U.S. Application Data

[63] Continuation of Ser. No. 434,333, Jan. 17, 1974, abandoned.

[51] Int. Cl.² .................... G06F 1/00; G05B 11/00
[52] U.S. Cl. ............................. 235/304.1; 364/900
[58] Field of Search ........ 235/151.11, 151.1, 153 AC, 235/153 AK, 304, 304.1; 364/200 MS, 900 MS

[56] References Cited

U.S. PATENT DOCUMENTS

| | | | |
|---|---|---|---|
| 3,686,639 | 8/1972 | Fletcher et al. | 364/200 |
| 3,701,113 | 10/1972 | Chace et al. | 235/151.11 |
| 3,810,104 | 5/1974 | Markley | 364/900 |
| 3,829,842 | 8/1974 | Langdon et al. | 235/151.11 |
| 3,969,703 | 7/1976 | Kwiatkowski et al. | 235/151.11 |

Primary Examiner—Malcolm A. Morrison
Assistant Examiner—Errol A. Krass
Attorney, Agent, or Firm—Quarles & Brady

[57] ABSTRACT

A programmable controller includes a hardwired monitor module which connects to the I/O address decoder and the central logic unit of the controller. The monitor module detects malfunctions which cause deviations in the operation of these elements from a prescribed pattern, and in response generates a disabling signal which deenergizes all operating devices on the controlled system. A diagnostic module is also included and is comprised of a set of routines stored in the controller memory which periodically direct the controller to operate according to a prescribed pattern and to indicate deviations from that pattern as a malfunction. Such malfunctions are indicated in a diagnostic register which connects to the monitor module.

4 Claims, 3 Drawing Figures

MALFUNCTION DETECTION SYSTEM FOR A PROGRAMMABLE CONTROLLER

This is a continuation, of application Ser. No. 434,333 filed Jan. 17, 1974 now abandoned.

BACKGROUND OF THE INVENTION

The field of the invention is programmable controllers, and more specifically, means for detecting and diagnosing malfunctions which may occur in either the controller or the system to which it is attached.

Programmable controllers such as that disclosed in U.S. Pat. No. 3,810,118 issued May 7, 1974, and entitled "Programmable Matrix Controller" are rapidly replacing relay panels and hardwired logic systems for many control applications. Sensing devices on the controlled system connect to the programmable controller and the condition of these sensing devices are monitored to provide information concerning the status of the controlled system. The programmable controller also connects to operating devices on the controlled system, and depending on the status of the system as indicated by the sensing devices, it selectively energizes the operating devices to provide the desired system operation. The desired system operation is determined by a control program which is comprised of a set of instructions stored in a controller memory. These instructions are sequentially read out of the controller memory to operate the programmable controller and attached system. For example, a series of instructions in the control program may examine the condition of an identified set of sensing devices on the controlled system, and depending upon the status of those sensing devices, a subsequent instruction will energize or deenergize an identified operating device on the controlled system. The program instructions are read out of the controller memory sequentially at a very high rate, and as a result, the examination of each sensing device and the energization or deenergization of operating devices are performed "serially" at a sufficiently high speed as to appear instantaneous to the controlled system. Each instruction is decoded by common circuitry and a single central logic unit performs the logical functions required by each instruction.

Although programmable controllers are constructed of highly reliable solid state logic devices, malfunctions can occasionally occur in the circuitry. In contrast to relay banks and hardwired logic controllers in which each operating device is separately controlled by distinct hardware, much of the hardware in a programmable controller operates "serially" to directly control all of the operating devices on the controlled system. Indeed, it is this feature which allows a programmable controller to perform complex control functions with a minimal amount of hardware, and which partially accounts for their increased usage in recent years. Therefore, although the likelihood of a malfunction occurring in a programmable controller is less than in a corresponding relay bank or hardwired logic controller, when a malfunction does occur its effect on the controlled system is much more difficult to predict and it is likely to have a more pervasive effect on the operation of the controlled system. Not only is the need for sensing the occurrence of a malfunction in a programmable controller most important, therefore, but it is also important that the controller be shut down when such a malfunction occurs.

SUMMARY OF THE INVENTION

The present invention relates to a malfunction detection system for a programmable controller which includes a diagnostic module which periodically operates the various programmable controller elements to evaluate whether they are operating properly and a monitor module which continuously monitors the condition of selected programmable controller elements, and deenergizes all of the operating devices on the controlled system connected to the programmable controller when a malfunction condition is detected.

A general object of the invention is to monitor the operation of key elements in the programmable controller and shut down the controlled system when a malfunction occurs. This is accomplished in part by a hardwired monitor module which is electrically connected to such key controller elements as the I/O address decoder and central logic input and output buses, and which contains circuitry that detects any deviation in operation of these elements from an expected pattern. Such deviations are registered as a malfunction in a latching circuit and the monitor module includes an output circuit which generates a disabling signal that deenergizes all of the operating devices on the controlled system. The general object of the present invention is also accomplished in part by a diagnostic module comprised of one or more diagnostic routines and a diagnostic register. The diagnostic routines check the operation of programmable controller elements by directing the controller to perform prescribed functions and detecting any deviations from expected results. Any such deviations are registered as a malfunction in the diagnostic register.

It is another object of the invention to combine the results of the diagnostic module with the results of the monitor module to provide a malfunction detection system for a programmable controller. The monitor module connects to the output of the diagnostic register and is responsive to any registered malfunction to deenergize the operating devices on the controlled system.

Still another object of the invention is to minimize the amount of additional hardware needed for the fault detection system. The diagnostic routines are stored in the controller memory and are executed along with the controller program. The diagnostic register is comprised of one or more conventional controller output circuits which have been reserved for this purpose, and the monitor module deenergizes the operating devices on the controlled system by disabling the output interface rack on the programmable controller.

A more specific object of the invention is to monitor the operation of the I/O address decoder in a programmable controller. This is accomplished by a parity checker in the monitor module which connects to the latching circuit and indicates a malfunction when the I/O decoder deviates from its expected pattern of operation.

Another specific object of the invention is to monitor the operation of the logic input and a logic output buses. This is accomplished by setting a flip-flop once during each scan of the controller program and connecting the monitored bus to reset the flip-flop when the logic state of the bus changes in a prescribed manner. If the state of the bus does not change in the prescribed manner, a malfunction is indicated to the latching circuit.

Still another specific object of the invention is to check the ability of the programmable controller to energize and deenergize output circuits and to check its ability to examine the condition of output circuits. This is accomplished by reserving an addressable output circuit for this purpose and alternating the state of that output circuit in a prescribed pattern. The condition of this output circuit is checked by examination instructions, and if the state of the output circut deviates from the prescribed pattern, the diagnostic routine indicates a malfunction to the diagnostic register.

Still another specific object of the invention is to check the operation of both the programmable controller and important devices on the controlled system. This is accomplished by periodically executing a routine stored in the controller memory which examines the condition of mutually exclusive events on the controlled system. If both events are found to occur concurrently a deviation in the expected operation of either the controlled system or the programmable controller is indicated and a malfunction is indicated to the diagnostic register.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention and reference is made to the claims herein for interpreting the breadth of the invention.

DESCRIPTION OF THE PREFERRED EMBODIMENT

Figure 1:
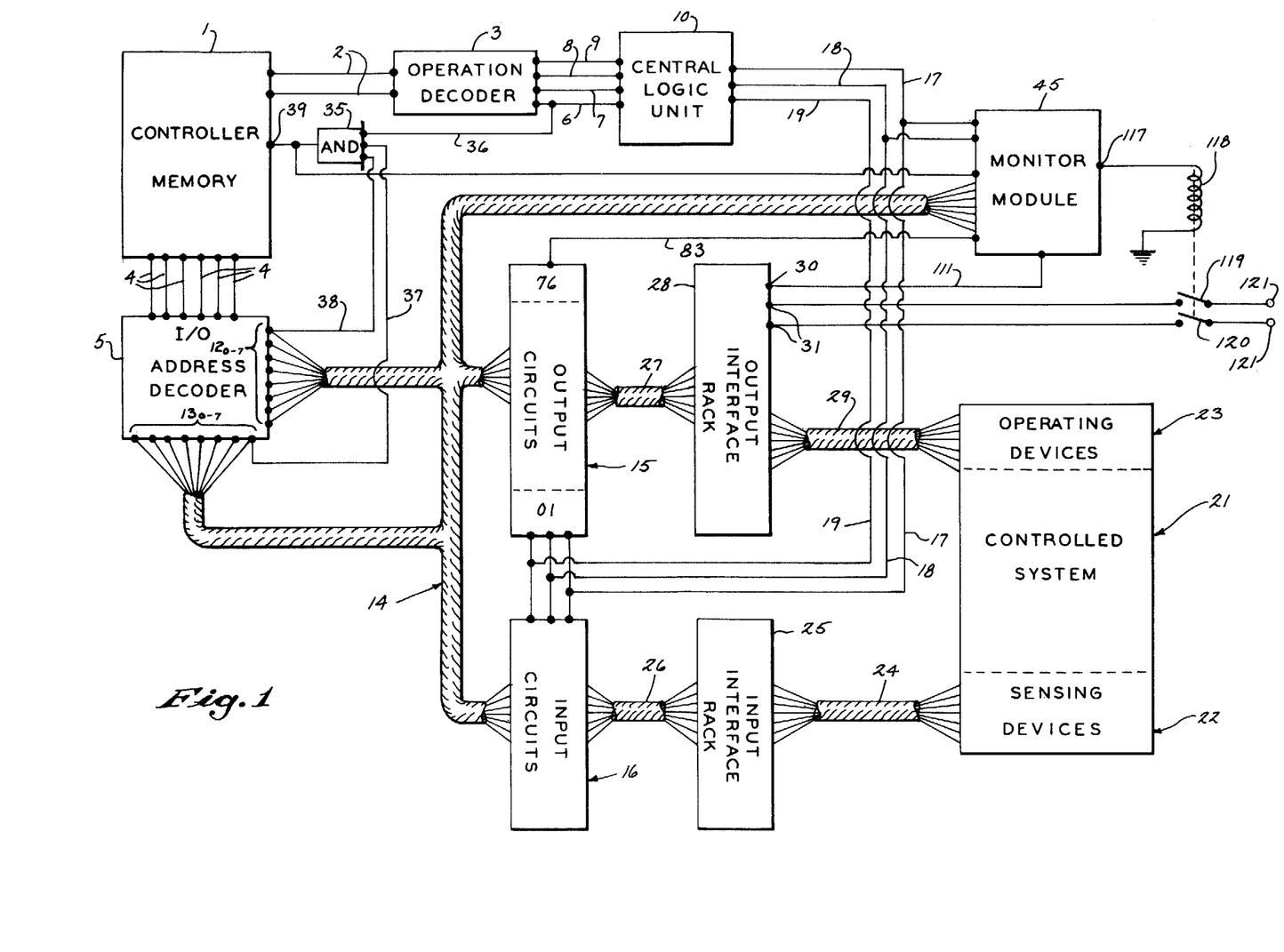
FIG. 1 is a block diagram of a programmable controller which incorporates the present invention.

Referring to FIG. 1, a programmable controller such as that disclosed in the above cited copending patent application and sold commercially under the trademark "Programmable Matrix Controller" by the Allen-Bradley Company, assignee of the present invention, includes a controller memory 1 which is comprised of a plurality of programmable read-only memory elements (pROM). The controller memory 1 stores a control program which is comprised of a series of eight-bit instructions that are read out of the memory in sequence, one at a time. Each instruction is comprised of a two-bit operation code which is read out through lines 2 to an operation decoder 3 and a six-bit address code which is read out through lines 4 to an I/O address decoder 5. Each pROM in the memory 1 stores 64 instructions, and to accommodate larger control programs a series of pROMs are used and the instructions in each are sequentially read out each time the memory is scanned. The operation of the controller memory 1 will be described in more detail hereinafter and reference is made to U.S. Pat. No. 3,798,612, issued Mar. 19, 1974, and entitled "Controller Programmer", and U.S. Pat. No. 3,813,649, issued May 28, 1974, and entitled "Controller Program Editor" for an explanation of how the control program is loaded into the controller memory 1.

The operation decoder 3 selectively generates one of four operation signals in response to each operation code received from the memory 1. These operation signals are conveyed to a central logic unit 10 over a set of four leads identified respectively as the XIO bus 6, the XIC bus 7, the BRT bus 8 and the SET bus 9. The central logic unit 10 controls the operation of the programmable controller in response to the received operation signals. For a more detailed description of the structure and operation of both the operation decoder 3 and the central logic unit 10, reference is made to the above cited copending patent application Ser. No. 137,923 entitled "Programmable Matrix Controller".

The I/O address decoder 5 receives the address codes which indicate one of the two digit octal numbers $00_8$-$77_8$. It is a commercially available integrated circuit which is reponsive to the six-bit binary address code in each instruction read from the controller memory 1 to generate an activate signal at one of eight most significant digit output terminals $12_{0-7}$ and one of the eight least significant digit output terminals $13_{0-7}$. The address decoder output terminals $12_{0-7}$ and $13_{0-7}$ connect to corresponding leads in an address cable 14 which in turn connects with a bank of output circuits 15 and a bank of input circuits 16. Each circuit in the banks 15 and 16 is uniquely connected to one of the most significant digit leads $12_{0-7}$ and one of the least significant digit leads $13_{0-7}$ in the address cable 14. Each input circuit and output circuit can thus be "addressed" when an activate signal is generated on both of these leads, and each such addressable circuit is identified hereinafter by its unique octal address $01_8$-$76_8$ (the octal addresses 00 and 77 are reserved for internal use). Although the relative number of input circuits to output circuits varies with the application, a total of sixty-two input and output circuits may be separately addressed by the programmable controller described herein. It should be understood, however, that the input-output capacity of the programmable controller can be increased by using an I/O address expansion technique such as that disclosed in U.S. Pat. No. 3,806,877, issued Apr. 23, 1974, and entitled "Programmable Controller Expansion Circuit". It should also be understood that read-write core memories which accommodate longer instructions, and thus longer address codes, can be used.

Each addressable input and output circuit $01_8$-$76_8$ in the circuit banks 15 and 16 is connected to the central logic unit 10 through a logic input bus 17, a logic output bus 18, and a clock pulse bus 19. The input circuit bank 16 and the output circuit bank 15 are also coupled to a controlled system 21. Such a controlled system may, for example, be a conveying system, a transfer line, a machine tool or a sorting mechanism, but in any case, it will include one or more sensing devices 22, such as limit switches, pressure gauges, thermostats and photoelectric cells, and one or more operating devices 23, such as solenoids and motors. Each sensing device 22 connects to the programmable controller through a cable 24 which connects with an input interface rack 25. The input interface rack 25 includes a plurality of interface circuits (not shown in the drawings) each having an input terminal which connects to the cable 24 and an output terminal which connects through a cable 26 to a designated input circuit in the bank 16. Although various types of interface circuits are available for the various types of sensing devices on the controlled system 21, a particularly useful interface circuit is disclosed in U.S. Pat. No. 3,643,115, issued on Feb. 15, 1972, and entitled "Interface Circuit for Industrial Control Systems". In summary, each sensing device 22 is coupled to an addressable input circuit in the bank 16, and each sensing device 22 can thus be separately addressed by the address code in a controller program instruction.

Each output circuit in the bank 15 connects through a cable 27 to a first input terminal on an associated output drive circuit (not shown in the drawings) in an output interface rack 28. In turn, each output drive circuit connects through a cable 29 to an associated operating device 23 on the controlled system 21. There are various types of output drive circuits available, the type selected being determined by the type of operating device 23 to be driven. A particularly useful output drive circuit is disclosed in U.S. Pat. No. 3,745,546 issued on July 10, 1973 and entitled "Controller Output Circuit". Each output drive circuit includes a second input terminal which connects to an enabling input terminal 30 on the output interface rack 28, and each operates to energize its associated operating device 23 when its associated output circuit in the bank 15 is energized and when a logic high enabling signal is applied to the enabling input terminal 30. Power is supplied to each output drive circuit in the interface rack 28 and the attached operating devices 23 through a pair of supply terminals 31.

Figure 3:
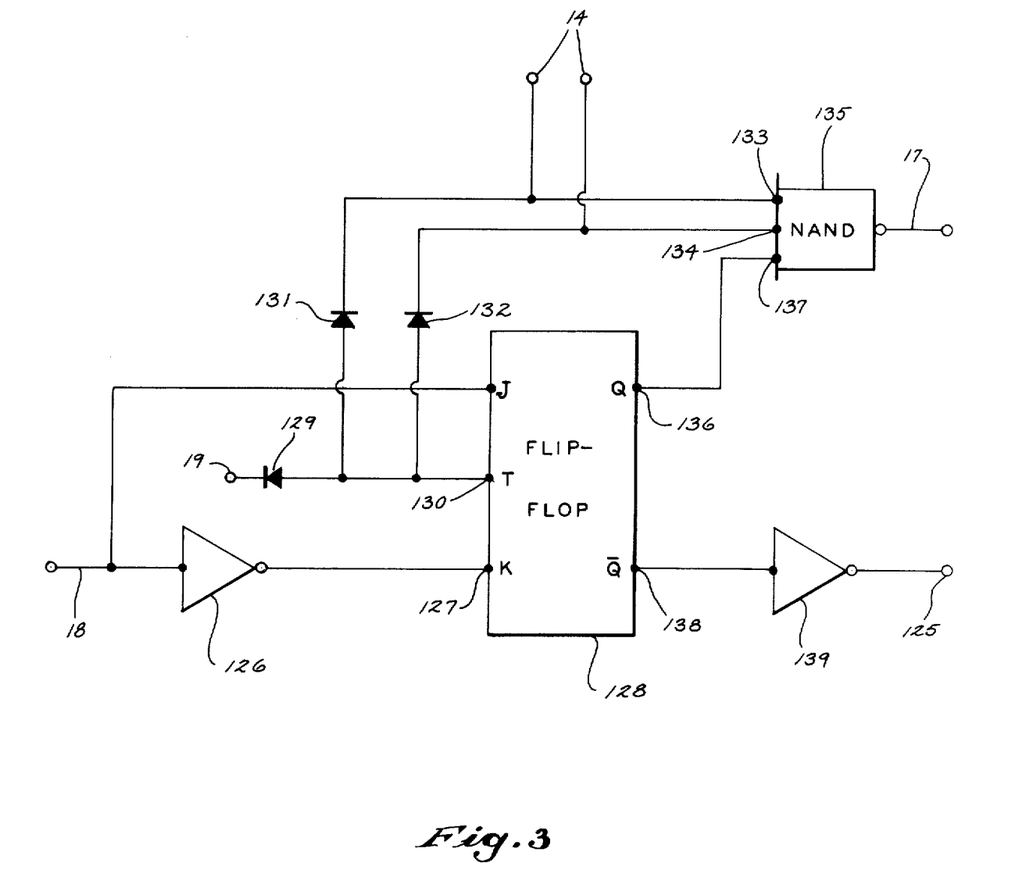
FIG. 3 is a schematic diagram of an output circuit which forms part of the present invention.

Referring to FIG. 3, each output circuit in the bank 15 is identical and each connects to the logic input bus 17, the logic output bus 18, and to a unique pair of leads in the address cable 14. Each output circuit also includes an output terminal 125 which connects with a lead in the cable 27. The logic output bus 18 connects through an input inverter circuit 126 to a K terminal 127 on a J-K flip-flop 128. The clock pulse bus 19 connects through a coupling diode 129 to a trigger terminal 130 on the flip-flop 128 and a pair of leads in the address cable 14 connect through coupling diodes 131 and 132 to the trigger terminal 130. The same address cable leads 14 also connect to a pair of input terminals 133 and 134 on a NAND gate 135 and a Q output terminal 136 on the J-K flip-flop 128 connects to a third input terminal 137 on the NAND gate 135. The output of the NAND gate 135 connects to the logic input bus 17 and a $\bar{Q}$ output terminal 138 on the J-K flip-flop 128 connects through an output inverter circuit 139 to the output terminal 125. For a more detailed description of the operation of the output circuits, reference is made to the above-cited copending patent application entitled "Programmable Matrix Controller".

In the preferred embodiment of the invention, the output circuits $01_8$ and $76_8$ do not connect with the output interface rack 28, but instead, are utilized as a diagnostic register. In this capacity, the output terminal 125 on the output circuit $01_8$ remains unconnected and the output terminal 125 on the output circuit $76_8$ connects through a lead 83 to a monitor module 45 to be described hereinafter.

The programmable controller thus far described performs four separate operations which are referred to as XIO, XIC, BRT and SET. The XIO operation examines the condition of an addressed input device 22 to determine whether it is open, or examines the condition of an addressed operating device 23 to determine whether it is deenergized. Somewhat similarly, the XIC operation examines the condition of an addressed input device 22 to determine whether it is closed, or it examines the condition of an addressed operating device 23 to determine whether it is energized. The SET operation either energizes of deenergizes an addressed operating device 23 depending on the outcome of the previous examination operations. The function of the BRT operation is confined to the central logic unit 10 where a logical OR is performed which allows the examination of a plurality of sensing devices or operating devices prior to a SET operation.

Referring to FIGS. 1 and 3, when the condition of a sensing device 22 connected to input circuit $43_8$ is to be examined, for example, an instruction containing an XIO or XIC operation code is read from the controller memory 1 and the addressed input circuit $43_8$ gates the condition, or logic state, of the sensing device 22 to the logic input bus 17. The operation code operates the central logic unit 10 to read this logic state and store the result. When a SET operation is performed, the central logic unit 10 generates a command signal over the logic output bus 18 to the addressed output circuit in the bank 15. The command signal sets or resets the J-K flip-flop 128 in that output circuit which in turn operates the associated output drive circuit in the interface rack 28. The output drive circuit supplies energy to one of the operating devices 23 from the supply terminals 31 when energized. As indicated previously, the control program is comprised of a series of instructions and the entire controller program is read out of the controller memory 1 each time it is scanned. Each instruction is executed in approximately ten microseconds and a typical controller program comprised of 300 instructions will be scanned in approximately three milliseconds. During each memory scan the condition of all the sensing devices 22 are examined and all of the operating devices 23 are placed in the state which will insure the desired function of the controlled system 21.

Referring to FIG. 1, to provide continuous memory scanning when the programmable controller is in operation an AND gate 35 has one input terminal connected to the XIO bus 6 through a lead 36, a second input terminal connected to the least significant digit terminal $13_7$ through a lead 37, a third input terminal connected to the most significant digit output terminal $12_7$ through a lead 38 and an output terminal connected to a reset terminal 39 on the controller memory 1. The last instruction in the controller program is a reset instruction (XIO77) which enables the AND gate 35 to generate a logic high to the reset terminal 39 which causes the control program to be reread.

It should be apparent from the above description that a malfunction in elements such as the controller memory 1, operation decoder 3, I/O address decoder 5, central logic unit 10 and the interconnecting buses and cables is likely to have an immediate and pervasive effect on all of the operating devices 23 in the controlled system 21. To prevent damage to the controlled system 21 and its surroundings, the malfunction detection system of the present invention monitors the operation of these key elements in the programmable controller and periodically checks their operation with a diagnostic module. When a malfunction is detected, a disable signal is generated which immediately disables the output drive circuits in the output interface rack 28. This in turn deenergizes the operating devices 23 on the controlled system 21. As will now be described in more detail, portions of the controller memory 1 are reserved for the diagnostic routines, and one or more addressable output circuits in the bank 15 serve as a diagnostic register. The monitoring operations are performed by a hardwired monitor module 45 which connects to the various controller elements being monitored. Although the diagnostic register may itself generate a disabling signal which can be used to deenergize the operating devices 23, in the preferred embodiment herein this disabling signal is instead applied to the monitor module 45 to indicate that a malfunction has occurred.

Figure 2:
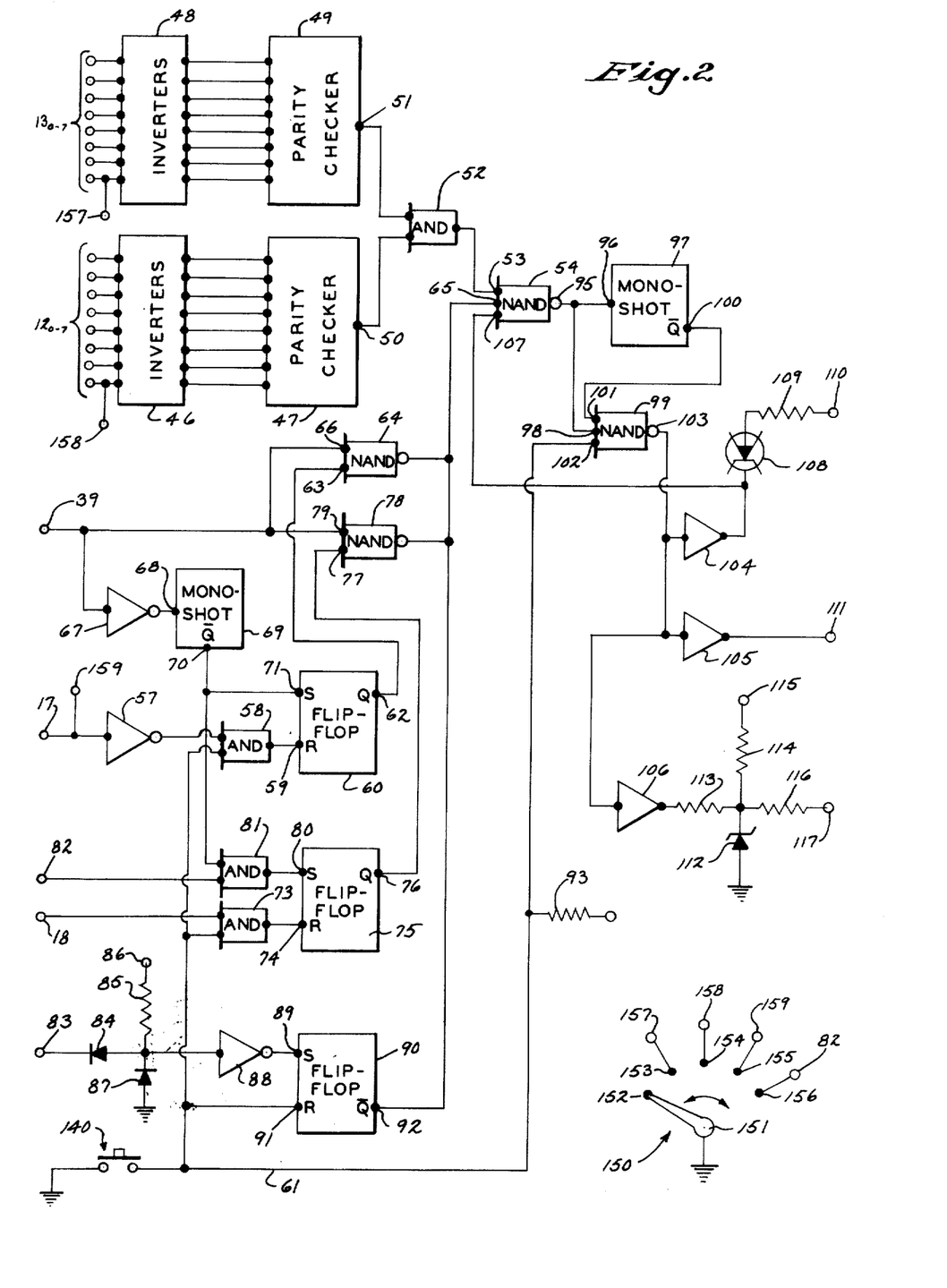
FIG. 2 is a schematic diagram of the monitor module which forms part of the present invention.

Referring to FIGS. 1 and 2, a monitor module 45 connects to the address cable 14 the logic input bus 17 and the logic output bus 18. The eight most significant address digit leads $12_{0-7}$ in the cable 14 connect through a set of eight inverter gates 46 to the eight input terminals on an eight-bit odd/even parity checker circuit 47. Similarly, the eight least significant address digit leads $13_{0-7}$ connect through eight inverter gates 48 to the eight input terminals on a second parity checker circuit 49. The parity checkers 47 and 49 are commercially available integrated circuits, such as SN74180 available from the Texas Instruments Company, and each includes an output terminal 50 and 51, respectively, at which a logic high voltage is generated when the number of logic low voltages applied to its eight input terminals are odd in number. In other words, as long as an odd number of most significant digit leads $12_{0-7}$ are at a logic high voltage the parity checker output terminal 50 will be at a logic high voltage, and as long as an odd number of least significant digit leads $13_{0-7}$ are at a logic high voltage the parity checker output terminal 51 will be at a logic high voltage. The output terminals 50 and 51 connect to the input terminals on an AND gate 52 and the output terminal of AND gate 52 connects to a first input terminal 53 on a first NAND gate 54.

The inverters 46 and 48, the parity checkers 47 and 49 and the AND gate 52 comprise an I/O address monitor circuit. Under normal operating conditions, one of the most significant digit leads $12_{0-7}$ and one of the least significant digit leads $13_{0-7}$ is at a logic high voltage and a logic high voltage is, therefore, applied to the first input terminal 53 on the first NAND gate 54. If a malfunction should occur which causes all least significant leads to go high, all most significant digit leads to go high, no least significant digit leads to go high, none of the most significant digit leads to go high, or any even combination of either the least significant digit or most significant digit leads to go high, the malfunction will be detected and a logic low voltage is applied to the first input terminal 53 on the first NAND gate 54.

The integrity of the logic input bus 17 and the logic output bus 18 are also monitored by the monitor module 45. The logic input bus 17 connects through an inverter gate 57 to one input terminal on an AND gate 58. The output of the AND gate connects to a reset terminal 59 on an R-S flip-flop 60 and a second input terminal on the AND gate 58 connects to a monitor module reset bus 61. A Q output terminal 62 on the flip-flop 60 connects to a first input terminal 63 on a NAND gate 64 and the output terminal on the NAND gate 64 connects to a second input terminal 65 on the first NAND gate 54.

The logic input bus 17 is checked during each memory scan to insure that it is not shorted to a logic low voltage level and that it does change logic state at least once during each memory scan. Accordingly, the memory reset terminal 39 on the controller memory 1 connects to a second input terminal 66 on the NAND gate 64 and through an inverter circuit 67 to an input terminal 68 on a monoshot circuit 69. The monoshot 69 is an integrated circuit No. SN15342 which is commercially available from the Texas Instruments Company. The monoshot 69 has a $\overline{Q}$ output terminal 70 which connects to a set terminal 71 on the flip-flop 60. Monoshot 69 is responsive at its input 68 to a rising edge of a voltage pulse to generate a and which is responsive to the trailing edge of a negative voltage pulse to generate a two-microsecond logic low voltage which sets the flip-flop 60. After each memory scan a ten microsecond negative memory reset pulse is applied to the monoshot circuit 69 which sets the flip-flop 60. A logic high voltage is thus generated at the flip-flop Q terminal 62 and is applied to the input 63 on the NAND gate 64.

Unless the flip-flop 60 is reset prior to the generation of the next logic high memory reset signal at the terminal 39, both inputs 63 and 66 to the NAND gate 64 will be at a logic high voltage and a malfunction will be indicated by a logic low applied to the second input terminal 65 on the first NAND gate 54. If, for example, the logic input bus 17 were to become shorted to ground, every XIC operation executed by the programmable controller would be true regardless of the condition of the input device 22 or operating device 23 being addressed. Under normal operating conditions, however, the logic input bus 17 will change logic states many times during each memory scan, and as a result, the flip-flop 60 will be reset through the inverter 57 and AND gate 58 shortly after it is set by the monoshot 69. Consequently, the Q terminal 62 is reset to a logic low voltage and the first input 63 on the NAND gate 64 is at a logic low voltage when the next logic high memory reset signal is applied to its input 66.

A similar check of the logic outut bus 18 is made by the monitor module 45. Because a continuously high logic state is potentially more damaging than a logic low, however, a slight variation is made in the above described circuit by connecting the logic output bus 18 directly to one input on an AND gate 73. The output of the AND gate 73 connects to a reset terminal 74 on a second flip-flop 75 and a second input terminal on the AND gate 73 connects to the reset bus 61. A Q output terminal 76 on the flip-flop 75 connects to a first input 77 on a NAND gate 78 and a second input 79 on the NAND gate 78 connnects to the memory reset terminal 39. Its output connects to the second input 65 on the first NAND gate 54. The second flip-flop 75 also includes a set input terminal 80 which connects to the output of an AND gate 81. One input terminal on the AND gate 81 connects to the $\overline{Q}$ output 70 on the monoshot circuit 69 and its other terminal connects to a test point 82.

The flip-flop 75 is operated in a manner similar to the flip-flop 60 described above to monitor the operation of the logic ouput bus 18. After each memory scan, the memory reset signal at the terminal 39 is applied to the input 79 on the NAND gate 78 and a two-microsecond logic low voltage is generated by the monoshot circuit 69 and applied to the set terminal 80 of the flip-flop 75 through the AND gate 81. The Q output terminal 76 on the flip-flop 75 is, therefore, set to a logic high voltage at the start of the next memory scan. Under normal operating conditions, the logic output bus 18 will change logic state many times during the next memory scan, and as a result, a logic low will be applied at some point in the memory scan through the AND gate 73 to reset the flip-flop 75. The Q output terminal 76 will, therefore, be reset to a logic low voltage which is applied to the input 77 on the NAND gate 78 prior to the next memory reset signal. The NAND gate output applied to the second input 65 on the first NAND gate 54 will, therefore, remain at a logic high voltage. If, on the other hand, the logic output bus 18 does not operate in its expected manner but instead, remains at a logic high voltage during the entire memory scan, the flip-flop 75 is not reset and the subsequent memory reset signal applied to the NAND gate 78 gates the malfunction indicating signal at the output of the flip-flop 75 through to the first NAND gate 54.

Referring to FIGS. 1 and 2, the monitor module 45 is connected to the output terminal of the output circuit $76_8$ by a lead 83. The lead 83 connects to the cathode of a coupling diode 84 and its anode connects through a resistor 85 to a positive d-c supply terminal 86 and through a clamping diode 87 to circuit ground. The anode also connects through an inverter circuit 88 to a set terminal 89 on a third R-S flip-flop 90. The flip-flop 90 includes a reset terminal 91 which connects to the reset bus 61 and a $\overline{Q}$ output terminal 92 which connects to the second input 65 on the first NAND gate 54.

When a malfunction is registered by the diagnostic module, a logic high voltage is generated on the lead 83 by the output circuit $76_8$. This logic high fault indicating signal is inverted by the circuit 88 and applied to the set terminal 89 to set the third flip-flop 90. As a result, a logic low voltage generated at the $\overline{Q}$ output terminal 92 is applied to the second input 65 on the second NAND gate 54 to indicate that a malfunction has occurred. Unlike those described above, the circuit operates independently of the memory reset signal to convey the fault indicating information to the second NAND gate 54.

The second NAND gate 54 forms part of a latching and output drive circuit in the monitor 45. More specifically, its output terminal 95 connects to an input terminal 96 on a second monoshot circuit 97 and to a first input terminal 98 on a third NAND gate 99. The monoshot circuit 97 is identical to the fist monoshot circuit 69 described above, and it includes a $\overline{Q}$ output terminal 100 which connects to a second input 101 on the third NAND gate 99. A third input terminal 102 on the NAND gate 99 connects to the reset bus 61 which is coupled to a logic high voltage source by resistor 93, and its output terminal 103 connects to the inputs of three output buffer circuits 104, 105 and 106. The output of buffer circuit 104 connects to a third input terminal 107 on the second NAND gate 54 and to the cathode of a light emitting diode 108. The anode of the light emitting diode 108 connects through a resistor 109 to a positive d-c supply terminal 110. The output of the buffer circuit 105 connects through a lead 111 to the enabling input terminal 30 on the output interface rack 28, and the output of the buffer circuit 106 couples to the cathode of a zener diode 112 through a resistor 113. The anode of the zener diode 112 connects to circuit ground and its cathode also connects through a resistor 114 to a positive d-c supply terminal 115 and through a second coupling resistor 116 to a monitor module output terminal 117. Referring particularly to FIG. 1, the output terminal 117 connects to one lead of a relay coil 118, the other lead of which is connected to circuit ground. The coil 118 is magnetically coupled to operate a pair of normally open contacts 119 and 120 which are connected in circuit between the supply terminals 31 on the output interface rack 28 and a pair of power supply terminals 121.

When either first input 53 or second input 65 on the second NAND gate 54 goes low indicating that a malfunction has occurred, logic low malfunction indication voltages are generated at the outputs of the three buffer circuits 104, 105 and 106. More specfically, when a malfunction is detected the output of the second NAND gate 54 goes to a logic high voltage which is applied to the input 98 of the NAND gate 99 and to the monoshot circuit 97. The $\overline{Q}$ output terminal 100 of the monoshot circuit 97 is immediately driven to a logic low voltage level and remains there for two microseconds to momentarily inhibit operation of the third NAND gate 99 and thus to insure that spurious noise voltages are not interpreted as a malfunction. At the end of two microseconds the $\overline{Q}$ terminal 100 rises to a logic high voltage and the output terminal 103 on the third NAND gate 99 is driven to a logic low voltage. This logic low is applied through the buffer circuit 104 to energize the light emitting diode 108 and to the third input terminal 107 of the second NAND gate 54 to latch the circuitry in a malfunction indicating state. The logic low output is also applied through the buffer circuit 105 and lead 111 to the enabling terminal 30 on the output interface rack to disable all of the output drive circuits, and it is applied through the output buffer circuit 106 to the relay coil 118. The relay coil 118 is thus deenergized and the contacts 119 and 120 drop out to their normally open position. Power to the output interface rack 28 is thus disconnected and all of the operating devices 23 in the controlled system 21 are deenergized.

When the malfunction condition has been corrected, the monitor module 45 is reset before the programmable controller is again operated. This is accomplished by depressing a reset pushbutton switch 140 which applies a logic low voltage to the reset bus 61. The NAND gate 99 ungates and the circuit latches in an operating state in which logic high voltages are generated at the outputs of the buffer circuits 104, 105 and 106.

Referring to FIG. 2, to insure that the monitor module 45 is operating properly, a five position selector switch 150 is provided to simulate a malfunction condition at various points in the programmable controller. The switch 150 includes a grounded movable contact 151 which is manually operated to connect with any one of five stationary contacts 152-156. Contact 152 is unconnected, contact 153 connects to a first test point 157 which connects to a least significant digit lead $13_{0-7}$ in the address cable 14, contact 154 connects to a second test point 158 which connects to a most significant digit lead $12_{0-7}$ in the address cable 14, contact 155 connects to a third test point 159 which connects to the logic input bus 17, and contact 156 connects to a test point 82 on AND gate 81. The selector switch is rotated to contact 152 when the programmable controller is to be operated. Periodically, however, the operation of the monitor module 45 is checked by rotating the switch 150 to each of the test points and observing whether a malfunction is properly indicated. The reset pushbutton switch 140 is depressed after each test to restart the programmable controller.

The diagnostic module of the present invention is comprised of a set of diagnostic routines which are stored in the controller memory 1 and which are executed during each scan of the controller program. As will become apparent from the discussion which follows, the output circuit $01_8$ is reserved for use with these routines and the output circuit $76_8$ is utilized to output the results of the diagnostic routines to the monitor module 45.

As indicated previously, the controller memory 1 is comprised of a plurality of programmable read-only memory units which are connected to a counter such that the sixty-four lines in each of the pROMs is read out once during each memory scan. The number of pROMs used in the controller memory 1 varies with the size of controller program and each is identified hereinafter by a Roman numeral which indicates the order in which it is addressed during each memory scan. To insure that the controller memory 1 is scanning through the intended controller program without skipping a memory pROM a diagnostic routine is used in combination with the output circuits $01_8$ and $76_8$ of the diagnostic register. The routine requires four lines of memory in each pROM and the routine causes the state of the output circuit $01_8$ to alternate in a prescribed pattern as the memory is scanned. The state of the output circuit $01_8$ is examined once every pROM and if found to deviate from the prescribed pattern, the output circuit $76_8$ is energized to indicate a fault to the monitor module 45. The following is the memory scanning fault detection routine for a four pROM memory.

| pROM No. | Line No. | Instruction | |
|---|---|---|---|
| I   | 00 | XIC | $01_8$ |
|     | 01 | SET | $76_8$ |
|     | :  | :   |        |
|     | 63 | XIO | $01_8$ |
|     | 64 | SET | $01_8$ |
| II  | 00 | XIO | $01_8$ |
|     | 01 | SET | $76_8$ |
|     | :  | :   |        |
|     | 63 | XIO | $01_8$ |
|     | 64 | SET | $01_8$ |
| III | 00 | XIC | $01_8$ |
|     | 01 | SET | $76_8$ |
|     | :  | :   |        |
|     | 63 | XIO | $01_8$ |
|     | 64 | SET | $01_8$ |
| IV  | 00 | XIO | $01_8$ |
|     | 01 | SET | $76_8$ |
|     | :  | :   |        |
|     | 61 | XIO | $01_8$ |
|     | 62 | SET | $01_8$ |
|     | 63 | XIO | $77_8$ |
|     | 64 | SET | $76_8$ |

As the pROMs I-IV are scanned and the instructions read out of the controlled memory 1, the output circuit $01_8$ is alternately energized and deenergized. At the beginning of each memory scan the output circuit $01_8$ is in its deenergized state, and as pROM I is scanned, it is energized by the combined instructions on lines 63 and 64. As pROM II is scanned it is deenergized by the combined instructions on lines 63 and 64; as pROM III is scanned it is energized by the combined instructions on lines 63 and 64, and as pROM IV is scanned it is deenergized by the combined instructions on lines 61 and 62. In other words, the state of the output circuit $01_8$ is changed once each pROM. A pair of instructions in each pROM I-IV checks to see that the state of the output circuit $01_8$ is altered in this prescribed pattern. If not, a malfunction is indicated and the output circuit $76_8$ is energized to operate the monitor module 45. More specifically, if the controller memory 1 is scanned properly, the output circuit $01_8$ is alternatively energized and deenergized by the SET instructions in each pROM I-IV and the alternating XIC and XIO instructions on line number 00 of each succeeding pROM is "untrue". Consequently, none of the SET instructions on line number 01 of each pROM I-IV energizes output circuit $76_8$. However, if for example, pROM II were missing or was not plugged in securely, a malfunction would be indicated because a deviation occurs in the prescribed pattern of operation. This deviation is sensed by the XIC instruction on line number 00 of pROM III which tests "true" and the SET instruction on line number 01 energizes output circuit $76_8$ to indicate the malfunction. The above routine in the diagnostic module not only checks the operation of the controller memory 1 to insure that it is scanned in order and that none of the pROMs is missing, but it also checks the operation of the other key elements in the programmable controller. The ability of the programmable controller to properly operate output circuits in response to SET instructions is checked because the failure of output circuit $01_8$ to be operated by SET instructions in the prescribed manner is detected. Also, the ability of the programmable controller to properly read the condition of output circuits is checked. It should be apparent that to perform these lattr functions, the above routine need not be dispersed throughout the controller memory 1, but instead may be collected together and executed separately.

As shown in the above routine, the last two instructions in the controller memory 1 operate to either reset the controller memory 1, or if this fails, to indicate a malfunction. An XIO $77_8$ instruction is stored on line number 63 of pROM IV and a SET $76_8$ instruction is stored on line 64. After the control program has been scanned, the XIO $77_8$ instruction gates the AND gate 35 and a memory reset signal is applied to the memory reset terminal 39. This signal resets the counters which control the memory scan and under normal operating conditions the control program is reexecuted. If the controller memory 1 is not properly reset however, the SET $76_8$ instruction on line number 64 of pROM IV is executed and a malfunction is indicated.

The above diagnostic routine is appropriate when an even number of pROMs are used in the controller memory 1. Because the output circuit $01_8$ should be deenergized at the beginning of each memory scan, however, when an odd number of pROMs are used a modification must be made to the above routine. If, for example, five pROMs are used, the diagnostic routine in pROMs IV and V is as follows:

| pROM No. | Line No. | Instruction | |
|---|---|---|---|
| IV  | 00 | XIO | $01_8$ |
|     | 01 | SET | $76_8$ |
|     | :  |     |        |
|     | 63 | XIO | $01_8$ |
|     | 64 | XIC | $01_8$ |
| V   | 00 | SET | $76_8$ |
|     | :  |     |        |
|     | 61 | XIO | $01_8$ |
|     | 62 | SET | $01_8$ |
|     | 63 | XIO | $77_8$ |
|     | 64 | SET | $76_8$ |

In this modified version of the diagnostic routine pROM IV does not alter the state of the output circuit $01_8$. As a result, the SET $01_8$ instruction on line 62 of pROM V deenergizes output circuit $01_8$, placing it in the required state for another scan through the controller memory 1. The removal of pROMs I, II, III or V will alter the pattern in which the state of output circuit $01_8$ is altered and such a malfunction will be detected as described above. To detect the absence of pROM IV, however, the first line in pROM V is a SET $76_8$ instruction and the last lines in pROM IV are a pair of instructions which examine mutually exclusive events. More specifically, the state of outut circuit $01_8$ is examined to see whether it is energized and deenergized concurrently. Since one or the other is untrue, the SET instruction which follows deenergizes output circuit $76_8$. If pROM IV is not scanned, however, the SET $76_8$ instruction in pROM V appears alone and output $76_8$ will be energized.

Other diagnostic routines are stored in the controller memory 1 to check the operation of both the programmable controller and the controlled system 21 by examining mutually exclusive events. For example, by testing two or more sensing devices 22 on the controlled system 21 which should not be closed at the same time it is possible to check if the programmable controller is treating all inputs as closed. The routine will also indicate a malfunction in either sensing device which causes their output to go low.

XIC over-temperature sensor
XIC under-temperature sensor
SET $76_8$

Similarly, by testing two or more sensing devices 22 which should not be open at the same time it is possible to check if the programmable controller is treating all inputs as open.

| | |
|---|---|
| XIO | normally closed limit switch on one end of a table |
| XIO | normally closed limit switch on the other end of the table |
| SET | $76_8$ |

Other mutually exclusive events which would be particularly destructive to the controlled system 21 if they occurred concurrently may be checked by the diagnostic routine. For example, if a brake is not released when an associated motor is energized, or if the lubricant pump is not energized when the motor is energized, the diagnostic output circuit $76_8$ can be energized to shut down the controlled system 21.

| | |
|---|---|
| XIC | brake |
| XIC | motor |
| BRT | |
| XIO | lubricant pump |
| XIC | motor |
| SET | $76_8$ |

Although the monitor module 45 continuously monitors the outputs of the I/O address decoder 5 another useful check of this controller element is made with the diagnostic module to detect a malfunction which causes any of the outputs $12_{0-7}$ or $13_{0-7}$ to remain at a logic high voltage. This is accomplished by examining the condition of all operating devices 23 having I/O addresses which contain the octal digit to be checked. If all of these operating devices are energized, a malfunction is presumed and diagnostic output circuit $76_8$ is energized. The following routine checks the operation of the least significant octal digit 4:

| | |
|---|---|
| XIC | $14_8$ |
| XIC | $24_8$ |
| XIC | $44_8$ |
| SET | $76_8$ |

In this routine, operating devices are connected to I/O addresses $14_8, 24_8$ and $44_8$, and when the least significant octal digit 4 malfunctions and remains at a logic high voltage, all of these operating devices will be energized during the memory scan. The diagnostic routine is stored at the end of the control program and since all of the XIC instructions will test true, the output circuit $76_8$ will be energized to indicate the malfunction. Similar routines can be included for each of the other I/O address digits as long as there are sufficient sensing devices 23 connected to I/O addresses containing the digit to insure that energization of all of them cannot occur except when a malfunction occurs. In other words, energization of all operating devices 23 having the same least significant digit is presumed to be a malfunction, and the diagnostic routine detects this deviation from the prescribed pattern of operation and indicates a malfunction at the diagnostic output $76_8$.

It should be apparent from the above description that numerous variations can be made in the routines of the diagnostic module without departing from the spirit of the invention. The diagnostic module checks the operation of the programmable controller by directing it to operate in a prescribed manner, sensing when it does not respond as directed, and indicating a malfunction condition. The diagnostic module may direct the programmable controller to examine the condition of devices in the controlled system which are known to be in prescribed conditions, and indicate a malfunction when a deviation is indicated, or the diagnostic module may direct the programmable controller to alternate the logic state of a device in a prescribed pattern and examine the condition of the device to determine whether it responds in the prescribed manner.

We claim:

1. In a programmable controller having a memory which stores a control program that is continuously and repeatedly executed to direct a logic unit to operate operating devices on a controlled system in response to the logic states of sensing devices on the controlled system, the improvement therein comprising a diagnostic module for periodically checking the operation of said programmable controller while it is on line, said diagnostic module including means for periodically operating said logic unit in a prescribed pattern, said means including a first set of instructions stored in said memory with the control program which directs the logic unit to operate an output in a prescribed pattern, means for detecting deviations in the operation of said logic unit from said prescribed pattern including a second set of instructions stored in said memory which direct the logic unit to examine the logic state of said output, and a diagnostic register for indicating a malfunction when a deviation is detected, wherein the execution of said first and second set of instructions are interleaved with the execution of the control program instructions.

2. The improvement as recited in claim 1 in which said programmable controller includes an output interface rack which delivers power to the operating devices on said controlled system when enabled and disabling means coupled to said diagnostic register for disabling the output interface rack when a malfunction is detected.

3. The improvement as recited in claim 1 which includes means comprising in part a third set of instructions for directng the logic unit to examine the condition of a pair of mutually exclusive events, and a fourth instruction which indicates a malfunction to said diagnostic register when the results of said examinations directed by said third set of instructions indicate that said mutually exclusive events have occurred concurrently.

4. In a programmable controller having a memory which stores a control program that directs the programmable controller to operate a controlled system having sensing devices which connect with addressable input circuits on the programmable controller and having operating devices which connect to addressable output circuits on the programmable controller, the improvement therein comprising a monitor module having inputs which connect to selected elements of said programmable controller; having means for periodically generating a reset signal; having a set of flip-flops, each with a first input terminal coupled to a corresponding one of said monitor module inputs and a second input terminal connected to receive said reset signal; having a set of gates, each with a first input connected to the output of a corresponding one of said flip-flops and a second input connected to receive said reset signal; and having a latching circuit which connects to the output of said gates, wherein said flip-flops are periodically set by said reset signal in a first state and are reset by a change in the logic state at their associated monitor module input, and wherein said flip-flop first state is gated to said latching circuit by its associated gate to indicate a malfunction if the flip-flop is not reset in its other state prior to the application of a subsequent reset signal to said gate.

* * * * *